US010895936B2

(12) United States Patent
Han et al.

(10) Patent No.: US 10,895,936 B2
(45) Date of Patent: Jan. 19, 2021

(54) DISPLAY APPARATUS

(71) Applicant: HEWLETT-PACKARD DEVELOPMENT COMPANY, L.P., Spring, TX (US)

(72) Inventors: Sangkoo Han, Suwon (KR); Hwikyeong An, Suwon (KR)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 16/376,734

(22) Filed: Apr. 5, 2019

(65) Prior Publication Data
US 2019/0235701 A1  Aug. 1, 2019

Related U.S. Application Data

(63) Continuation of application No. PCT/KR2017/000004, filed on Jan. 2, 2017.

(30) Foreign Application Priority Data

Oct. 5, 2016 (KR) .......... 10-2016-0128325

(51) Int. Cl.
*G06F 3/042* (2006.01)
*G06F 3/041* (2006.01)
*G02B 6/32* (2006.01)

(52) U.S. Cl.
CPC ............ *G06F 3/0421* (2013.01); *G02B 6/32* (2013.01); *G06F 3/042* (2013.01); *G06F 3/0412* (2013.01)

(58) Field of Classification Search
CPC ..... G06F 3/0421; G06F 3/0438; G06F 3/0428
See application file for complete search history.

(56) References Cited

U.S. PATENT DOCUMENTS

| | | | | |
|---|---|---|---|---|
| 4,198,623 A | * | 4/1980 | Misek | G06F 3/0421 250/221 |
| 4,825,212 A | * | 4/1989 | Adler | G06F 3/0436 310/313 A |
| 2005/0128190 A1 | | 6/2005 | Ryynanen | |
| 2011/0050639 A1 | | 3/2011 | Challener et al. | |
| 2011/0074735 A1 | * | 3/2011 | Wassvik | G06F 3/0421 345/175 |
| 2011/0181552 A1 | * | 7/2011 | Goertz | G06F 3/0428 345/175 |
| 2012/0218226 A1 | | 8/2012 | Wang et al. | |
| 2015/0015545 A1 | * | 1/2015 | Ting | G06F 3/0423 345/175 |
| 2015/0022475 A1 | * | 1/2015 | Watanabe | G06F 3/041 345/173 |
| 2016/0154533 A1 | | 5/2016 | Eriksson et al. | |
| 2018/0267672 A1 | * | 9/2018 | Wassvik | G06F 1/3262 |

FOREIGN PATENT DOCUMENTS

| | | | | |
|---|---|---|---|---|
| SE | 15501455 | * | 2/2015 | ........... G06F 1/3262 |
| WO | WO-2010-141388 | | 12/2010 | |

* cited by examiner

*Primary Examiner* — Kevin M Nguyen
(74) *Attorney, Agent, or Firm* — Staas & Halsey LLP

(57) ABSTRACT

A display apparatus including a display, and a detector which is coupled to the display. The touch detector is to detect a touch input when light passing through a touch area on the display is blocked. The touch detector includes a cover member covering the display, and the cover member includes at least one curved surface formed to guide light passing through the touch area.

14 Claims, 7 Drawing Sheets

(a)

| RADIUS OF CURVATURE (R) (mm) | Flat | 3000 | 4000 | 6000 | 8000 | 10000 | 12000 | 14000 | 16000 | 18000 | 20000 |
|---|---|---|---|---|---|---|---|---|---|---|---|
| LIGHT EFFICIENCY | 1.0 | 1.32 | 1.74 | 2.66 | 2.57 | 2.25 | 2.01 | 1.84 | 1.72 | 1.63 | 1.56 |

(b)

| RADIUS OF CURVATURE (R) (mm) | Flat | 2000 | 3000 | 4000 | 6000 | 8000 | 10000 | 12000 | 14000 | 16000 | 18000 |
|---|---|---|---|---|---|---|---|---|---|---|---|
| LIGHT EFFICIENCY | 1.0 | 0.90 | 2.28 | 2.12 | 1.72 | 1.51 | 1.40 | 1.33 | 1.28 | 1.24 | 1.21 |

(a)

(b)

(c)

DISPLAY APPARATUS

CROSS REFERENCE TO RELATED APPLICATIONS

This application is a continuation application of International Patent Application No. PCT/KR2017/000004, filed on Jan. 2, 2017, which claims the benefit of Korean Patent Application No. 10-2016-0128325, filed on Oct. 5, 2016, in the Korean Intellectual Property Office, the disclosure of which is incorporated herein in its entirety by reference.

BACKGROUND

In general a display apparatus with a touch screen panel (TSP) is an input apparatus which, upon receiving push or contact of the screen on the display surface of the display by a finger, a pen, etc., recognizes the location of the push or contact and transmits the information on the location to the system, and it is a technology that is being distributed widely following distribution of smartphones.

DETAILED DESCRIPTION

Figure 1:
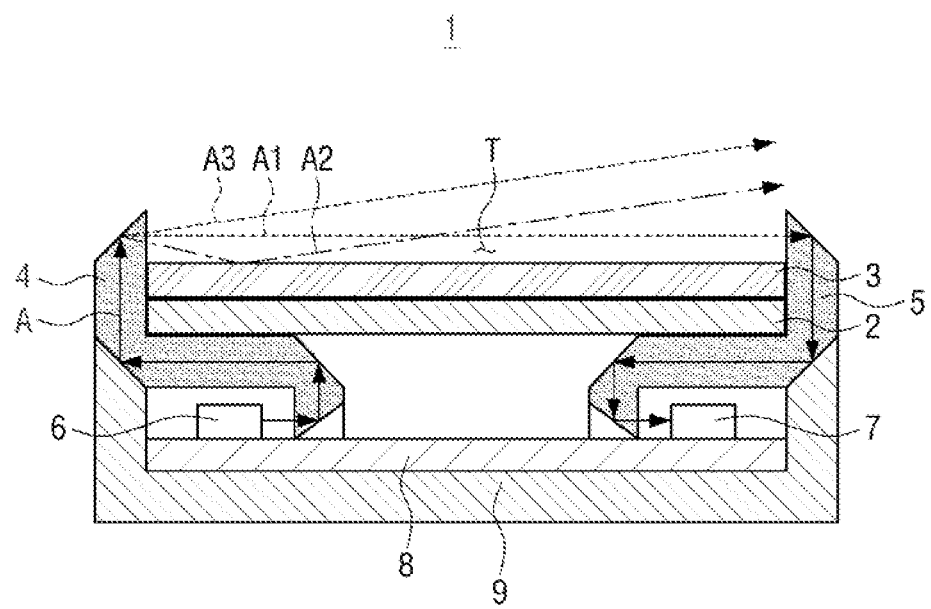
FIG. 1 is a sectional view schematically illustrating a configuration of a display apparatus with a touch detector.

Hereinafter, examples of the disclosure will be described in detail with reference to the accompanying drawings. The examples described below will be described based on examples that are most appropriate for understanding the technical characteristics of the disclosure. Meanwhile, it should be noted that the examples described below are not for limiting the technical characteristics of the disclosure, but for showing that the disclosure may be implemented as in the examples described below.

Accordingly, various modifications may be made through the examples described below within the technical scope of the disclosure, and the modified examples are within the technical scope of the disclosure. Also, with respect to the reference numerals described in the accompanying drawings for promoting understanding of the examples described below, components that are related to one another among components performing the same operations in each example were referred to by the same or similar numbers.

A touch screen panel includes a display, a touch detecting unit, a controller integrated circuit (IC), driver machine readable instructions, etc. A touch detecting unit includes an upper plate to which a transparent electrode (indium tin oxide, ITO) is deposited, and a lower plate (film or glass), and performs the role of identifying the location where a signal was generated according to occurrence of contact or change of electrical capacity, and transmitting the information on the location to a controller IC.

A controller IC performs the role of modifying an analog signal transmitted from a touch detecting unit into a digital signal and changing the signal to a form of a coordinate which can be displayed on the screen, and driver machine readable instructions is a program which receives a digital signal received from a controller IC and controls a touch detecting unit to be implemented properly according to each operation system.

A touch screen panel as described above can be classified into a resistive type, a capacitive type, an ultrasonic type, an optical type using light such as infrared rays, etc., according to the applied technologies.

Meanwhile, a touch screen panel in an infrared type uses infrared rays, and utilizes the attribute of infrared rays of being blocked when they collide with an obstacle. A TSP in an infrared type as described above has a structure wherein a matrix is formed by arranging a large number of light emitting diodes (LEDs) and photo diodes around a panel such that a plurality of LEDs emitting infrared rays and a plurality of photo diodes corresponding to each of the LEDs oppose one another. For such a structure, a principle that when a shape that can form a shadow (e.g., a finger, a stick, or an object such as a pencil and a brush, hereinafter referred to as an object in a specific form) contacts the screen and blocks rays, the output of the blocked portion is reduced, and the location of input of the touch is determined by obtaining the coordinate of the portion, is used.

In this case, as an input apparatus, a finger or an object in a specific form can be used. Also, as a TSP in an infrared type may have high light permeability, high durability, and is applicable to a large screen, it is mainly being applied to ATM machines, kiosks, etc.

In the case of a display apparatus to which a TSP in an inferred type as described above is applied, a plurality of LEDs and a plurality of photo diodes are arranged to oppose one another around the display, so that light emitted from the plurality of LEDs can be introduced into the plurality of corresponding photo diodes across the screen.

Meanwhile, in the process wherein light emitted from LEDs as described above is introduced into photo diodes across a touch area in the front side of the display, loss of light occurs due to the distance between the LEDs and the photo diodes.

In particular, as in the case of a display apparatus 1 illustrated in FIG. 1, light A crossing a touch area T in the front side of the display 2 can be diffused while it moves from a light emission guide member 4 to a light reception guide member 5 across the touch area T.

Accordingly, in the case of normal bunch light A1 that moves from the center of a light emitting surface of the light emission guide member 4 toward the center of an incidence surface of the light reception guide member 5, the light can move from the light emission guide member 4 to the light reception guide member 5 normally.

However, downward bunch light A2 that is irradiated from the light emitting surface of the light emission guide member 4 in a downward sloped way can be lost, as it is reflected toward the front side of the display 2 at the cover glass 3 in the form of a plane disposed on the front surface of the display 2.

Also, upward bunch light A3 that is irradiated from the light emitting surface of the light emission guide member 4 in an upward sloped way can be lost, as it is irradiated outside the front side of the display apparatus 1.

In addition, in case the distance between the light emitting part and the light receiving part becomes greater as the size of the display becomes bigger, the amount of loss of light passing through the touch area T can become bigger.

Due to such loss of light, the accuracy of touch recognition through a TSP is reduced, and thus malfunction of the apparatus can occur. Also, in the case of increasing the output of LEDs to complement loss of light, the life of the LEDs may be shortened.

In FIG. 1, reference numeral 6 refers to a LED, reference numeral 7 refers to a photo diode, reference numeral 8 refers to a printed circuit hoard (PCB), and reference numeral 9 refers to a rear cover, respectively, which are reference numerals not described herein.

A display apparatus according to an example of the disclosure described below may be an apparatus with a TSP in an infrared type, and also an electronic apparatus. In addition, the display apparatus may be a display apparatus which detects a touch input as different types of light other than infrared rays, or radio waves such as ultrasonic waves pass through a touch area in the front side of the display surface of the display, and the location wherein the light or radio waves are blocked by a touch input of a user is detected.

Figure 2:
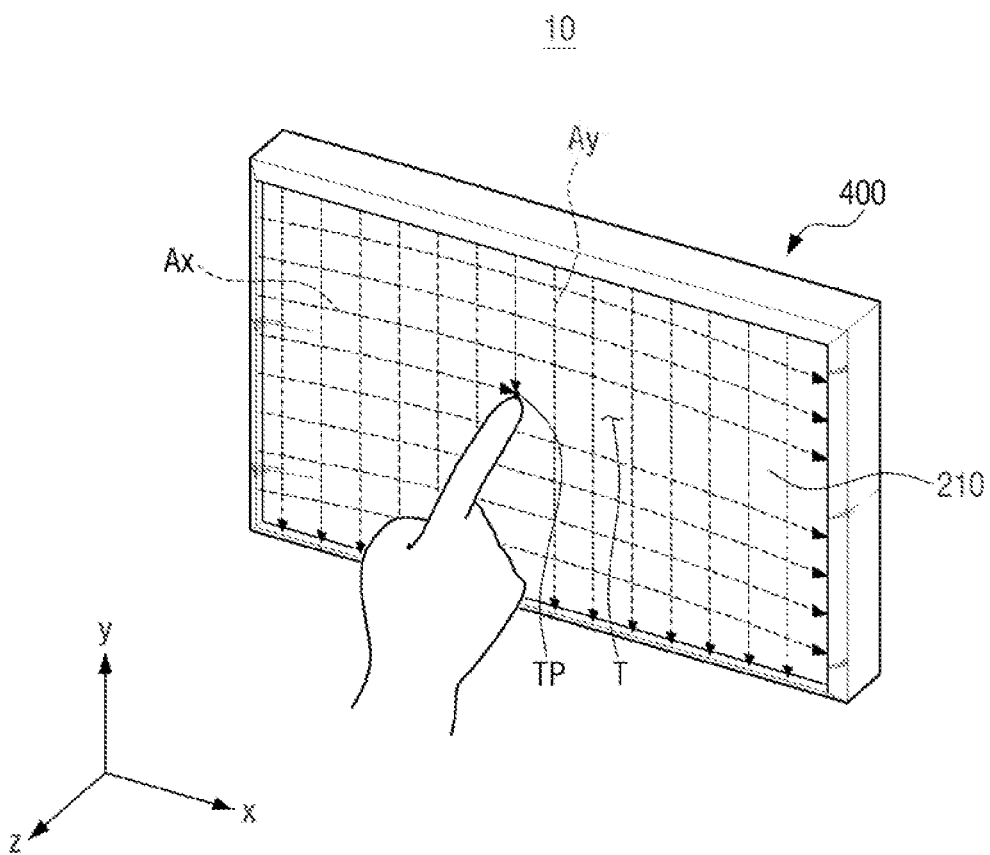
FIG. 2 is perspective view schematically illustrating a display apparatus according to an example of the disclosure.
Figure 3:
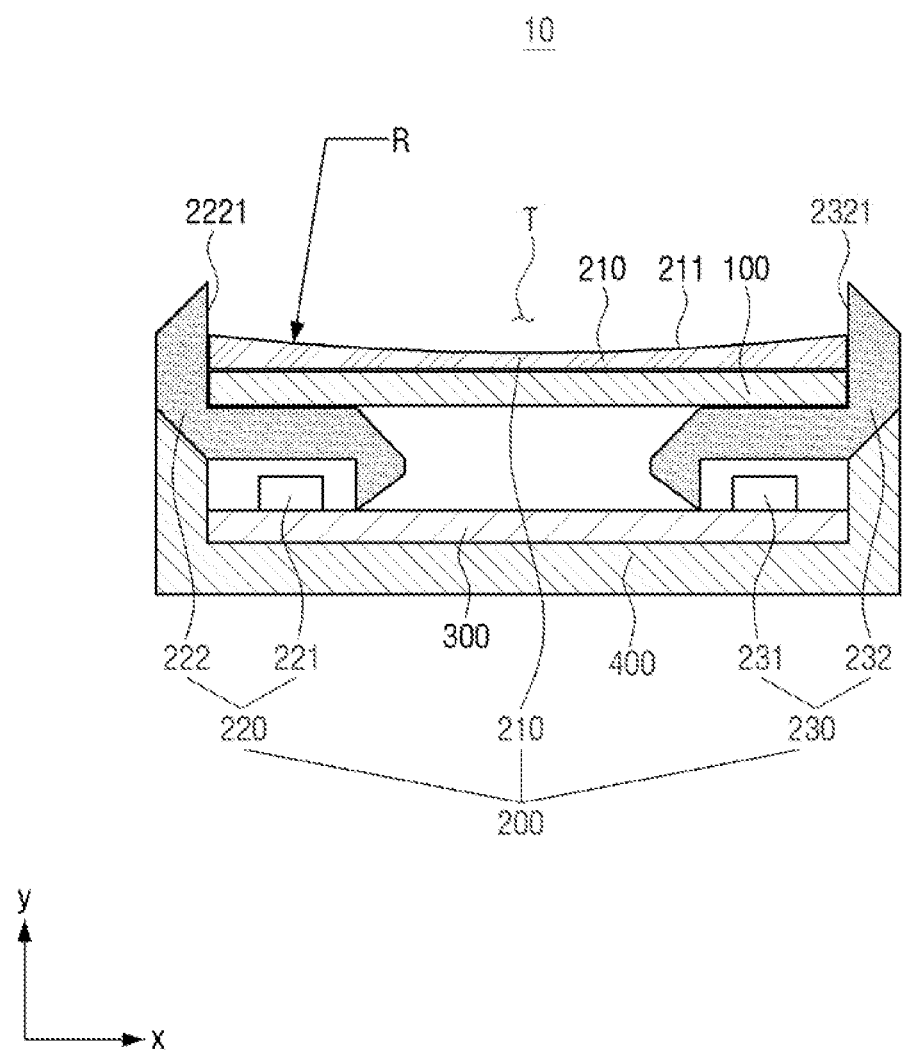
FIG. 3 is a sectional view schematically illustrating a configuration of the display apparatus illustrated in FIG. 2.

FIG. 2 is a perspective view schematically illustrating a display apparatus 10 according to an example of the disclosure, and FIG. 3 is a sectional view schematically illustrating a configuration of the display apparatus 10 illustrated in FIG. 2.

Hereinafter, a configuration of the display apparatus 10 will be described with reference to FIGS. 2 and 3.

As illustrated in FIGS. 2 and 3, the display apparatus 10 includes a display 100, a touch detector 200, a printed circuit board 300, and a rear cover 400.

The display 100 includes a display surface that displays a screen toward the front side (a z axis).

The display 100 may be in the form of a rectangular flat plate wherein the front surface is flat. Also, the display 100 may include a backlight unit (not shown), a reflective sheet (not shown), an optical sheet (not shown), a liquid crystal panel (not shown), etc.

Other than the above-mentioned form, the display may be modified in various forms such as an oval, a circle, etc., and in this case, the touch detector, the printed circuit board, and the rear cover may also be modified correspondingly to the form of the display.

As the display 100 is identical or similar to a technology that is widely used in general, detailed description therefor will be omitted.

The touch detector 200 includes cover glass 210, a light emitting part 220, and a light receiving part 230.

The touch detector 200 according to an example of the disclosure will be described based on an example wherein the touch detector 200 is a touch detector 200 in an infrared type which detects that the flow of light crossing a touch area T in the front side of the display surface of the display 100, for example, light such as infrared rays is blocked by a touch input, and acquires the coordinate of the location, and determines the coordinate wherein the touch was input.

Also, the touch detector 200 according to an example of the disclosure may detect a touch by using invisible light or radio waves such as ultrasonic waves other than infrared rays.

The cover glass 210 is coupled to the display surface of the display 100, and covers the display surface of the display 100.

The cover glass 210 is made of a light permeable material such as glass, and thus the screen displayed on the display surface of the display 100 can be displayed in the front side through the cover glass 210.

Further, the cover glass 210 is concavely curved so as to guide light passing through the touch area T, and the front surface 211 of the cover glass 210 is concavely curved. The detailed configuration of the cover glass 210 will be described later.

The light emitting part 220 may be disposed on an edge on one side of the display 100, and light emitted from the light emitting part 220 may cross the touch area T, and may be incident on the light receiving part 230 that is disposed in a location opposing the light emitting part 220.

The light emitting part 220 may include a plurality of LEDs 221, and the light receiving part 230 may include a plurality of photo diodes 231 that correspond to the plurality of LEDs 221.

The LEDs 221 may include light emitting diodes (LEDs) or laser diodes (LDs), etc., and the photo diodes 231 may include a light sensor, etc.

The light emitting part 220 and the light receiving part 230 may be disposed along the edges of the display 100, and may surround the edges of the display 100. Meanwhile, the light emitting part 220 and the light receiving part 230 may be disposed to oppose each other, so that light emitted from the light emitting part 220 can be detected through the light receiving part 230.

Also, a plurality of LEDs 221 may be disposed along an edge of the display 100, and on an edge of the display 100 opposing the plurality of LEDs 221, a plurality of photo diodes 231 may be disposed.

For example, as illustrated in FIG. 2, the display 100 may include edges on its upper, lower, left, and right sides, and the light emitting part 220 may be disposed on the edges on the upper and left sides of the display 100, and may emit light crossing the entire touch area T from the edges on the upper and left sides of the display 100.

Also, the light receiving part 230 may be disposed on the edges on the lower and right sides of the display 100 that oppose the light emitting part 220, and may detect light that was emitted from the light emitting part 220 and passed through the touch area T.

That is, the light emitting part 220 disposed on the edge on the left side of the display 199 may irradiate light in a first direct Ax along a X axis, and the light emitting part 220 disposed on the edge on the upper side of the display 100 may irradiate light in a second direction Ay along a y axis.

The first direction Ax and the second direction Ay may be orthogonal to each other, and light that moves along the first direction Ax and the second direction Ay may pass through the touch area T in the front side of the display surface while covering the entire touch area T.

Meanwhile, as illustrated in FIG. 2, if a touch is input into the touch area T from a user, light that is emitted from the light emitting part 220 on the edge on the left side of the display 100 and moves to the first direction Ax, and light that is emitted from the light emitting part 220 on the edge on the upper side of the display 100 and moves to the second direction Ay are simultaneously blocked at the input touch point TP.

Through this, light is not detected at the light receiving part 230 in a location corresponding to the TP, or the amount of light detected is reduced. Accordingly, a controller (not shown) may acquire the coordinate of the TP through the location of the light receiving part 230, and determine the coordinate of the touch input.

As described above, the light emitting part 220 may include a plurality of LEDs 221. In addition, the light emitting part 220 may further include a light emission guide member 222 that guides light emitted from the LEDs 221 and emits the light to a touch area T.

Also, the light receiving part 230 may include a plurality of photo diodes 231. In addition, the light receiving part 230 may further include a light reception guide member 232 that guides incident light which passed through the touch area T to the photo diodes 231.

As illustrated in FIG. 3, on the rear side of the display 100 which is opposite to the front side wherein the display surface is disposed, a printed circuit board 300 on which LEDs 221 and photo diodes 231 are mounted may be disposed. Meanwhile, on the rear sides of the display 100, the touch detector 200, and the printed circuit board 300, a rear cover 400 covering the mat sides may be coupled.

The printed circuit board 300 may control the LEDs 221 and the photo diodes 231 through a controller, by applying power sources and electronic signals to the mounted LEDs 221 and photo diodes 231. Further, on the printed circuit board 300, various components constituting the display apparatus 10 may be mounted, in addition to the LEDs 221 and the photo diodes 231.

Light emitted from the LEDs 221 disposed on the rear side of the display 100 may be irradiated in a direction crossing the touch area T, that is, a first direction Ax and a second direction Ay, through the light emission guide member 222 surrounding the side surface of the display 100.

Further, light that moved across the touch area T through the light emission guide member 222 may be incident on the photo diodes 231 disposed on the rear side of the display 100, through the light reception guide member 232 that surrounds the side surface of the display 100 and is disposed in a location opposing the light emission guide member 222.

As described above, in the display apparatus 10 according to an example of the disclosure, the LEDs 221 and the photo diodes 231 are disposed on the rear side of the display 100, but not in the side portion, and light emitted from the LEDs 221 is guided to the touch area T and the photo diodes 231 through a separate light emission guide member 222 and a separate light reception guide member 232. Accordingly, the thickness of the bezel of the display apparatus 10 can be reduced.

In addition, the light emission guide member 222 and the light reception guide member 232 may be components that form the exterior of the display apparatus 10, while surrounding the side surfaces of the display 100. Also, as illustrated in FIG. 2, the light emission guide member 222 and the light reception guide member 232 may form the entire exterior of the display apparatus 10, while being coupled to the rear cover 400.

As described above, the light emission guide member 222 and the light reception guide member 232 form the exterior of the display apparatus 10, together with the rear cover 400. Thus, a compact structure wherein the thickness of the bezel of the display apparatus 10 is more reduced is possible.

Further, the light emission guide member 222 and the light reception guide member 232 surrounding the side surfaces of the display 100 may be integrally formed, and may be constituted in the form of a closed loop surrounding the outer sides of the display 100.

Also, as the LEDs and the photo diodes are directly disposed on the side portion of the display, and the LEDs directly emit light that is directed toward the photo diodes across the touch area, a display apparatus in a simpler structure wherein a separate light emission guide member and a separate light reception guide member are omitted is possible.

Light that is incident on one ends of the light emission guide member 222 and the light reception guide member 232 may pass through the inside of the display apparatus and may be emitted to the outside through the other ends opposing the one ends.

The light emission guide member 222 may be disposed on the edges on the upper and left sides of the display 100, and the light reception guide member 232 disposed in a location opposing the light emission guide member 222 may be disposed on the edges on the lower and right sides of the display 100.

As an example, the light emitting surface 2221 of the light emission guide member 222 may be disposed on the edges on the upper and left sides of the display 100, and the incidence surface 2321 of the light reception guide member 232 may be disposed on the edges on the lower and right sides of the display 100.

Through this, light may be irradiated in the first and second directions Ax, Ay through the light emitting surface 2221 of the light emission guide member 222, and the light irradiated in the first and second directions Ax, Ay may pass through the touch area T, and may be incident on the incidence surface 2321 of the light reception guide member 232.

Further, disposition of the light emission guide member and the light reception guide member may be changed into various forms according to the direction of light moving through the touch area T.

As illustrated in FIG. 3, the light emission guide member 222 and the light reception guide member 232 wherein light moves along the insides may be in the form of having a plurality of curved parts, according to the form of the display apparatus 10, and disposition of the LEDs 221, the photo diodes 231 and the touch area T. The curved parts may function as reflecting parts that change the moving direction of light moving in the insides of the light emission guide member 222 and the light reception guide member 232.

Light emitted from the LEDs 221 disposed on the rear side of the display 100 is introduced into one end of the light emission guide member 222, and is reflected on a plurality of curved parts on the inside of the light emission guide member 222, and accordingly, the path of the light changes. Then, the light is emitted to the touch area T through the light emitting surface 2221 on the other end of the light emission guide member 222.

Afterwards, the light emitted through the light emitting surface 2221 of the light emission guide member 222 passes through the touch area T, and then becomes incident on the incidence surface 2321 of the light reception guide member 232.

The light incident on the incidence surface 2321 of the light reception guide member 232 is reflected on a plurality of curved parts in the light reception guide member 232 as it passes through the inside of the light reception guide member 232, and accordingly, the path of the light changes. Ultimately, the light becomes incident on the photo diodes 231 disposed on the rear side of the display 100.

As illustrated in FIG. 3, in order that light emitted from the light emitting surface 2221 of the light emission guide member 222 passes through the touch area T formed on the front side of the cover glass 210, and moves to the incidence surface 2321 of the light reception guide member 232, the light emitting surface 2221 of the light emission guide member 222 and the incidence surface 2321 of the light reception guide member 232 are formed to protrude toward the front side more than the cover glass 210.

Accordingly, the touch area T can be positioned between the light emitting surface 2221 of the light emission guide member 222, the incidence surface 2321 of the light reception guide member 232, and the front surface 211 of the cover glass 210.

Figure 4:
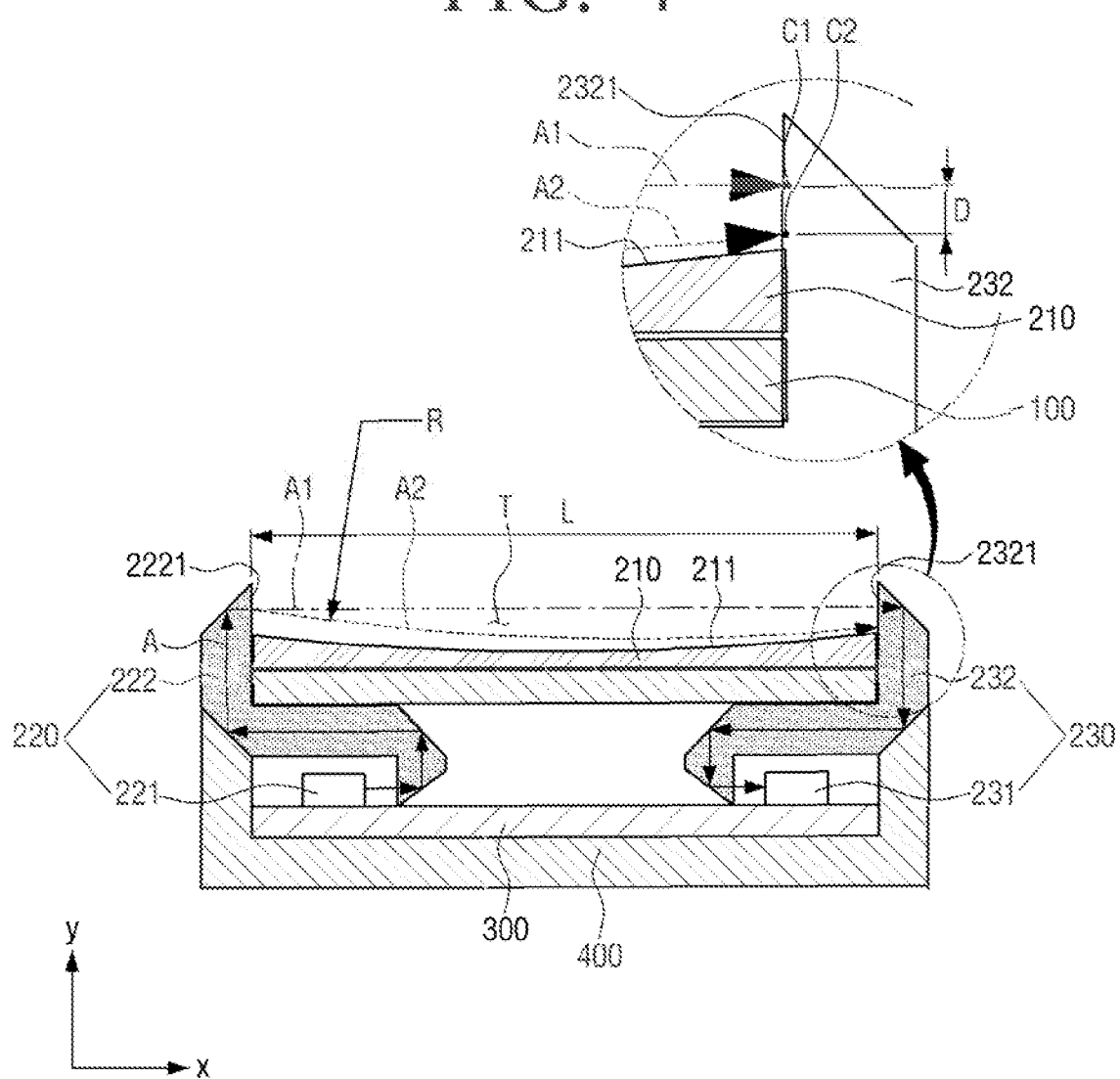
FIG. 4 is a sectional view illustrating the path of light of the display apparatus illustrated in FIG. 3.

FIG. 4 is a sectional view illustrating the path of light of the display apparatus 10 illustrated in FIG. 3.

Hereinafter, the process wherein light passing through the touch area T through the cover glass 210 is guided will be described with reference to FIG. 4.

As described above, the from surface 211 of the cover glass 210 covering the display surface of the display 100 is in the form of being concavely curved toward the rear side of the display surface, and the front surface 211 may be curved along at least one direction between the first direction and the second direction Ax, Ay in which light moves.

For example, the front surface 211 of the cover glass 210 may be concavely curved along the first direction Ax, as illustrated in FIGS. 2 to 4.

In FIGS. 2 to 4, light that moves through the touch area T along the first direction Ax, and the front surface 211 of the cover glass 210 that is concavely curved along the first direction Ax were illustrated as an example, for the convenience of explanation. However, the front surface of the cover glass may also be concavely curved along various directions, according to the moving direction of light.

For example, the front surface 211 of the cover glass 210 may be concavely curved along the second direction Ay that is orthogonal to the first direction Ax, and the front surface 211 may also be concavely curved along both of the first direction Ax and the second direction Ay.

In addition, the front surface 211 of the cover glass 210 may include a spherical surface or an aspherical surface, and it may also include a multiple curved surface that includes both a spherical surface and an aspherical surface. Also, the front surface 211 of the cover glass 210 may include an atypical curved surface.

As described above, the concavely curved front surface 211 of the cover glass 210 may be changed into various forms according to the moving direction of light passing through the much area T. Also, the front surface 211 may be in various forms that guide light passing through the touch area T to the light reception guide member 232.

Meanwhile, the concavely curved front surface 211 of the cover glass 210 may be curved within a range that the screen displayed through the display part of the display 100 is not distorted.

As illustrated in FIG. 4, light A emitted from the LEDs 221 becomes incident on one end of the light emission guide member 222, and reaches the light emitting surface 2221 of the light emission guide member 222 through reflection, and is then emitted to the touch area T formed on the front side of the front surface 211 of the cover glass 210 through the light emitting surface 2221 of the light emission guide member 222.

Meanwhile, the light A emitted through the light emitting surface 2221 of the light emission guide member 222 may be diffused to normal bunch light A1 that is oriented toward the center of the incidence surface of the display 100, downward bunch light A2 that is irradiated from the light emitting surface 2221 of the light emission guide member 222 toward the front surface 211 of the cover glass 210 in a downward sloped way, and upward bunch light (not shown) that is irradiated from the light emitting surface 2221 of the light emission guide member 222 in a upward sloped way, by its diffusiveness.

The downward bunch light A2 may be guided as it is reflected in a curved way along the front surface 211 of the cover glass 210 that is concavely curved along the first direction Ax, and may move to the incidence surface 2321 of the light reception guide member 232.

The light that is guided through the front surface 211 of the cover glass 210 will be described in detail below.

As described above, as the downward bunch light A2 emitted from the light emitting surface 2221 of the light emission guide member 222 is reflected in a curved way along the concavely curved front surface 211 of the cover glass 210, loss of light, which is generated as the downward bunch light A2 is reflected toward the outside of the front side of the display surface of the display 100 on the front surface of the cover glass, can be prevented.

Through this, accuracy of touch recognition through the touch detector 200 can be enhanced.

As described above, the front surface 211 of the cover glass 210 may be concavely curved along at least one direction between the first direction Ax and the second direction Ay. Also, the front surface 211 may be changed into various forms that can guide light that is irradiated from the light emitting surface 2221 of the light emission guide member 222 and passes through the touch area T to the incidence surface 2321 of the light reception guide member 232.

As an example, the from surface 211 of the cover glass 210 may be curved at a predetermined radius of curvature R, and the front surface 211 of the cover glass 210 may be curved in a plurality of radiuses of curvature R as it includes a multiple curved surface or an atypical curved surface.

Meanwhile, the path of light that passes through the touch area T is also changed into various forms so as to detect a touch input according to the changes in the shape, size, etc. of the display 100. Thus, by changing the radius of curvature of the concavely curved front surface of the cover glass, and the shapes of the included curved surfaces in various ways according to the path of light, a cover glass having the highest light efficiency can be constituted.

Figure 5:
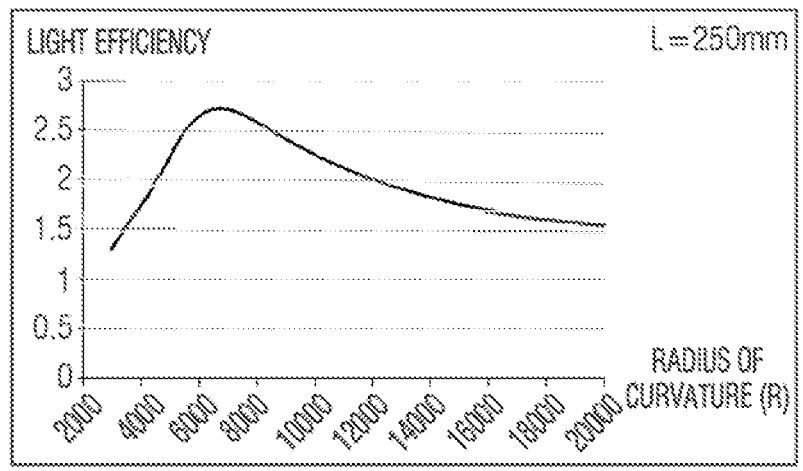
FIG. 5 is a graph and a chart illustrating the light efficiency of a touch detector according to an example of the disclosure.
Figure 5:
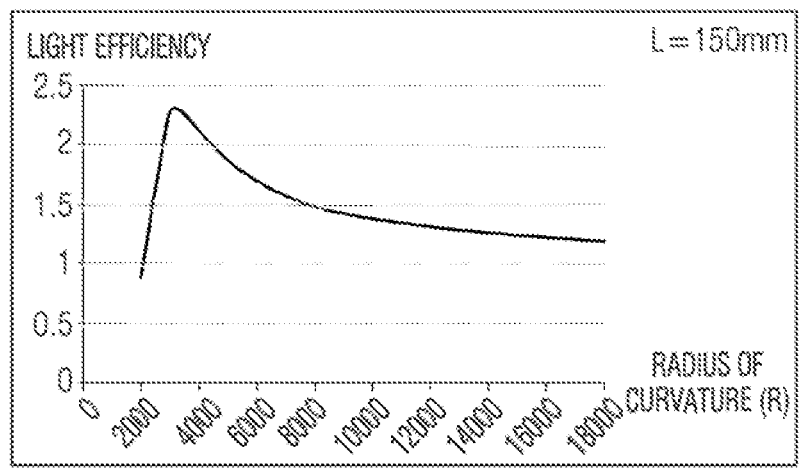

FIG. 5 is a graph and a chart illustrating the light efficiency of a touch detector according to an example of the disclosure.

Hereinafter, a structure wherein the light efficiency of light that is guided through the front surface 211 of the cover glass 210 can be increased will be described, focused on the relation among the radius of curvature R of the front surface 211 of the cover glass 210, a first distance L between the light emitting surface 2221 of the light emission guide member 222 and the incidence surface 2321 of the light reception guide member 232, and a second distance D between the center C1 of the incidence surface 2321 of the light reception guide member 232 and the light reception center C2 which is the center of light incident on the incidence surface 2321 illustrated in FIG. 4, based on the data illustrated in FIG. 5.

The light reception center C2 which means the center of light incident on the incidence surface 2321 of the light reception guide member 232 may be the point wherein the strength of light introduce into the incidence surface 2321 is the highest, and the center C1 of the incidence surface 2321 and the light reception center C2 which is the point wherein the strength of light introduced into the incidence surface 2321 is the highest may be separated at a distance. Also, the second distance D may be the vertical distance between the center C1 of the incidence surface 2321 and the light reception center C2.

The part A in FIG. 5 illustrates a graph and a chart wherein light efficiency according to change of the radius of curvature R of the front surface 211 of the cover glass 210 was measured based on a case wherein the first distance L is 250 mm, and the light efficiency when the front surface of the cover glass 210 is flat is sent as 1.0.

The part b in FIG. 5 illustrates a graph and a chart wherein light efficiency according to change of the radius of curvature R of the front surface 211 of the cover glass 210 was measured based on a case wherein the first distance L is 150 mm, and the light efficiency when the front surface of the cover glass 210 is flat is set as 1.0.

It can be figured out that in A in FIG. 5, the light efficiency was measured to be maximum around the point wherein the radius of curvature R of the front surface 211 of the cover glass 210 is 6000 mm, and in b in FIG. 5, the light efficiency was measured to be maximum around the point wherein the radius of curvature R of the front surface 211 of the cover glass 210 is 3000 mm.

As can be seen above, the radius of curvature R of the front surface 211 of the cover glass 210 and the first distance L may be inverse proportional to each other.

Further, if the radius of curvature R becomes bigger than a size, light efficiency through the front surface 211 structure of the cover glass 210 becomes not so much different from that of the cover glass in the form of a plane. Also, if the second distance D becomes bigger than a size, there is a limitation that the radius of curvature R of the front surface 211 of the cover glass 210 or the first distance L should become very small, for securing light efficiency.

Accordingly, based on the result of analyzing the data values illustrated in FIG. 5, for securing light efficiency, the radius of curvature R of the front surface 211 of the cover glass 210, the first distance L between the light emitting surface 2221 of the light emission guide member 222 and the incidence surface 2321 of the light reception guide member 232, and the second distance D between the center C1 of the incidence surface 2321 of the light reception guide member 232 and the light reception center C2 which is the center of light incident on the incidence surface 2321 may satisfy the following conditional expression.

$$0 \leq \frac{\text{the second distance}}{\text{the first distance}} \times \text{the radius of curvature} \leq 600 \quad \text{[Conditional Expression]}$$

The conditional expression above was derived through the experimental data illustrated in FIG. 5, and it means a condition wherein light efficiency is improved when the front surface 211 of the cover glass 210 is concavely curved, compared to when the front surface of the cover glass is in a flat shape.

As an example, according to the above conditional expression and the graph and the chart illustrated in FIG. 5, in case the value of "the second distance D/the first distance L×the radius of curvature R" is equal to or smaller than 600, the light efficiency is measured to be higher than 1.0 which is the standard light efficiency when the front surface of the cover glass is flat. Meanwhile, in case the value exceeds 600, the light efficiency is measured to be lower than 1.0 which is the standard light efficiency when the front surface of the cover glass is flat.

Figure 6:
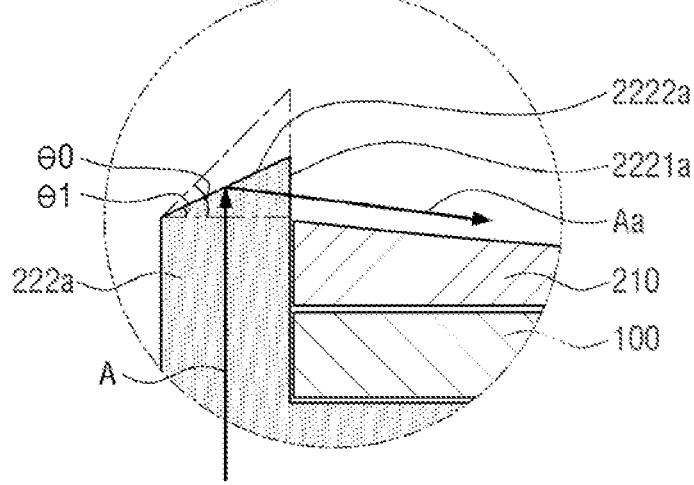
FIG. 6 is a partial sectional view illustrating a modified example of the light emission guide member illustrated in FIG. 3.
Figure 6:
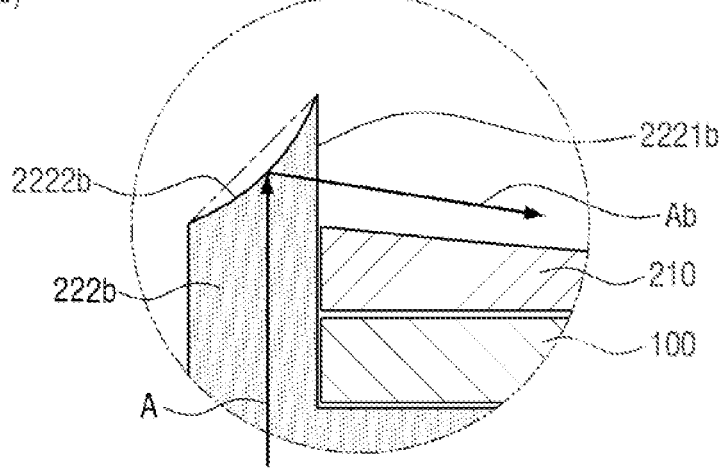
Figure 6:
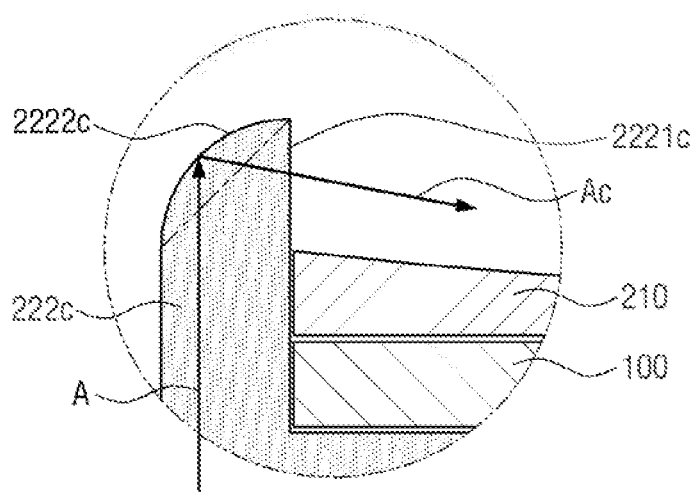

FIG. 6 is a partial sectional view illustrating a modified example of the light emission guide member illustrated in FIG. 3.

The parts A to c of FIG. 6 are enlarged views of the structure of one end which is adjacent to the light emitting surface emitting light of the light emission guide member.

Referring to A of FIG. 6, one end which is adjacent to the light emitting surface 2221*a* of the light emission guide member 222*a* may include a reflecting part 2222*a* which is tilted at a first angle θ1 with respect to a plane parallel to the display surface of the display 100.

By adjusting the first angle θ1 of the reflecting part 2222*a*, the angle of the light Aa that is irradiated onto the touch area T from the Light emitting surface 2221*a* of the light emission guide member 222*a* can be changed.

In A of FIG. 6, a case wherein the angle of the reflecting part 2222*a* was changed to the first angle θ1 which is smaller than the initial angle θ0 at the light emission guide member 222 illustrated in FIG. 3 was illustrated as an example. However, the disclosure is not limited thereto, and a change wherein the first angle θ1 becomes greater than the initial angle θ0 is also possible.

By adjusting the first angle θ1 of the reflecting part 2222*a*, the reflecting part 2222*a* can be tilted at an angle in a downward sloped way, so that the light Aa irradiated onto the light emitting surface 2221*a* is directed toward the front surface 211 of the cover glass 210. Through this, the angle of curved reflection at the front surface 211 of the cover glass 210 can be adjusted, and accordingly, the amount of light directed toward the incidence surface 2321 of the light reception guide member 232 can be increased.

Referring to b and c of FIG. 6, one end which is adjacent to the light emitting surface 2221*b*, 2221*c* of the light emission guide member 222*b*, 222*c* may include a lens part 2222*b*, 2222*c* that adjusts the light emitted from the light emitting surface 2221*b*, 2221*c*.

As illustrated in b of FIG. 6, the lens part 2222*b* may include a convex mirror or a concave lens, and through this, the angle of the light Ab that is irradiated toward the front surface 211 of the cover glass 210 can be adjusted, or the light Ab can be diffused such that the amount of light of the normal bunch light from the light emitting surface 2221*b* of the light emission guide member 222*b* or the downward bunch light that is guided through the front surface 211 of the cover glass 210 can be increased.

Further, as illustrated in c of FIG. 6, the lens part 2222*c* may include a concave mirror or a convex lens, and may collect light inside the light emission guide member 222*c*, and emit the collected light Ac from the light emitting surface 2221*c*.

As described above, by irradiating collected light Ac onto the touch area T, loss of light can be further reduced.

Figure 7:
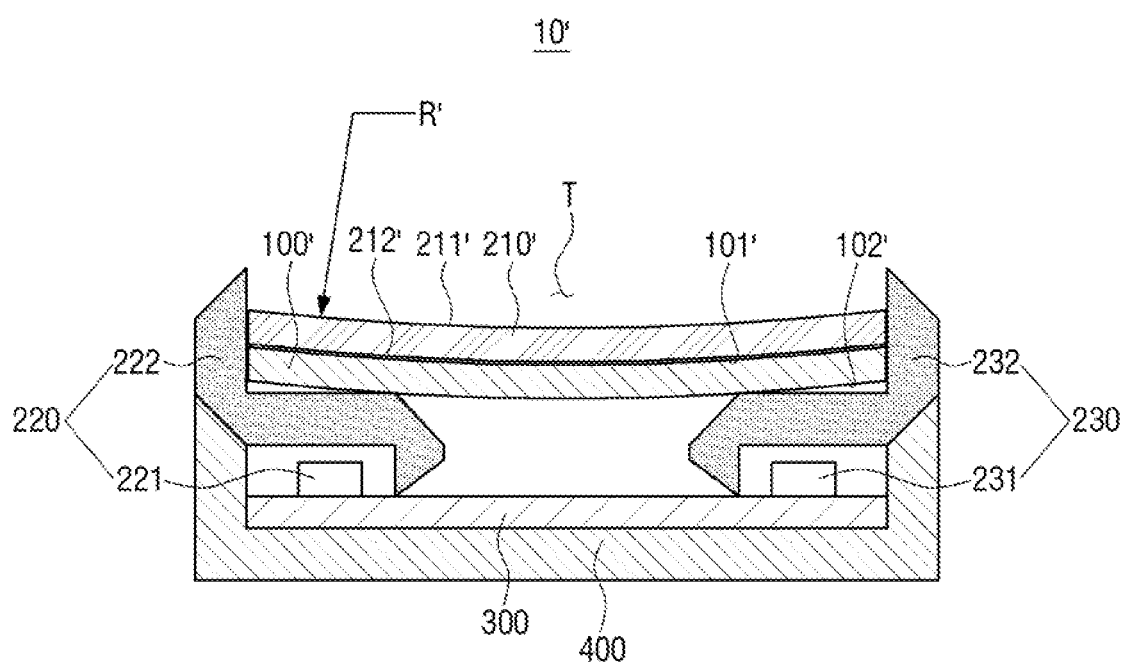
FIG. 7 is a sectional view schematically illustrating a display apparatus according to another example of the disclosure.

FIG. 7 is a sectional view schematically illustrating a display apparatus 10' according to another example of the disclosure.

Most of the components of the display apparatus 10' illustrated in FIG. 7 are identical to those of the display apparatus 10 illustrated in FIG. 3. Thus, overlapping explanations will be omitted.

As illustrated in FIG. 7, the front surface 211' of the cover glass 210' of the display apparatus 10' is concavely curved, and also, the rear surface 212' of the cover glass 210' is also concavely curved.

For example, the rear surface 212' of the cover glass 210' may be curved along at least one direction between the first direction and the second direction Ax, Ay.

As the cover glass 210' includes a light permeable material, light emitted from the light emitting surface 2221 of the light emission guide member 222 may move along the inside of the cover glass 210', and may be incident on the incidence surface 2321 of the light reception guide member 232.

Accordingly, the rear surface of the cover glass 210' may also be concavely curved along the moving direction of light moving through the touch area T, and thus light passing through the inside of the cover glass 210' may be guided to the incidence surface 2321 of the light reception guide member 232.

For this, the front surface 211' and the rear surface 212' of the cover glass 210' may be curved surface in the same shape. In addition, their radiuses of curvature R' may be the same.

In addition, as illustrated in FIG. 7, as the display surface of the display 100 is also curved, a screen enabling enhanced visibility and immersion for a user can be displayed through the display surface. Also, the front surface 211' and the rear surface 212' of the cover glass 210', and the display surface of the display 100 can be constituted in the form of the same curved surface having the same radius of curvature R'.

Through this, the visibility and immersion of the screen displayed through the display 100 can be enhanced, and at the same time, accuracy of a touch input through the touch detector 200 can also be enhanced.

While the various examples of the disclosure have been described separately from one another, the examples do not have to be implemented independently, but the configuration and operation of each example may be implemented in combination with at least one other example.

Also, while examples of the disclosure have been shown and described, the disclosure is not limited to the aforementioned examples, and it is apparent that various modifications can be made by those having ordinary skill in the art to which the disclosure belongs, without departing front the gist of the disclosure as claimed by the appended claims, and such modifications are not to be interpreted independently from the technical idea or prospect of the disclosure.

What is claimed is:

1. A display apparatus comprising:
   a display having a display surface; and
   a touch detector including cover glass coupled with the display surface to detect a touch input when light passing through a touch area in a front side of the display surface is blocked,
   wherein a front surface of the cover glass includes a concave curvature to guide the light passing through the touch area, the concave curvature being curved along a first direction and a second direction which are orthogonal to each other.

2. The display apparatus of claim 1,
   wherein
   the light passing through the touch area is to move in the first direction and the second direction.

3. The display apparatus of claim 1,
   wherein the concave curvature is a spherical surface or an aspherical surface.

4. The display apparatus of claim 1,
   wherein the concave curvature is an atypical curved surface.

5. The display apparatus of claim 1,
   wherein the concave curvature is a multiple curved surface.

6. The display apparatus of claim 1,
   wherein a rear surface of the cover glass includes a concave curvature curved along a first direction and a second direction corresponding to the concave curvature of the front surface, and
   wherein the light passing through the touch area is to move in the first direction and the second direction which are orthogonal to each other.

7. The display apparatus of claim 1,
   wherein the touch detector comprises;
   a light emitting part, the light emitting part being disposed on an edge of the display and to emit light in a direction crossing the touch area; and
   a light receiving part, the light receiving part being disposed to oppose the light emitting part and to detect light emitted from the light emitting part.

8. The display apparatus of claim 7,
   wherein the light emitting part comprises:
   at least one light emitting diode; and
   a light emission guide member to guide light emitted from the at least one light emitting diode and to emit the light to the touch area, and
   the light receiving part comprises:
   at least one photo diode; and
   a light reception guide member to guide incident light to the at least one photo diode.

9. The display apparatus of claim 8,
   wherein one end from which the light of the light emission guide member is to be emitted comprises a lens part.

10. The display apparatus of claim 8,
    wherein one end which is adjacent to a light emitting surface of the light emission guide member comprises a reflecting part, the reflecting part being tilted at an angle with respect to the display surface.

11. The display apparatus of claim 8,
    wherein a first distance between a light emitting surface of the light emission guide member and an incidence surface of the light reception guide member, a second distance between a center of the incidence surface and a light reception center which is a center of light incident on the incidence surface, and a radius of curvature of the front surface of the cover glass are set to satisfy $$0 \le \frac{\text{the second distance}}{\text{the first distance}} \times \text{the radius of curvature} \le 600.$$

12. A display apparatus comprising:
    a display having a display surface; and
    a touch detector to detect a touch input when light passing through a touch area in a front side of the display surface is blocked,
    wherein the touch detector comprises:
    a light emitting part to emit light;
    a light receiving part disposed in a location opposing the light emitting part and to detect light emitted from the light emitting part; and
    cover glass having a front surface including a concave curvature to guide light directed from the light emitting part toward the light receiving part, the concave curvature being curved along a first direction and a second direction which are orthogonal to each other.

13. The display apparatus of claim 12,
    wherein
    the light passing through the touch area is to move in the first direction and the second direction.

14. A display apparatus comprising:

a display having a display surface; and a touch detector including cover glass coupled with the display surface to detect a touch input when light passing through a touch area in a front side of the display surface is blocked, wherein a first distance between a light emitting surface of a light emitting part and an incidence surface of a light receiving part of the touch detector, a second distance between a center of the incidence surface and a light reception center which is a center of light incident on the incidence surface, and a radius of curvature of a front surface of the cover glass are set to satisfy $$0 \leq \frac{\text{the second distance}}{\text{the first distance}} \times \text{the radius of curvature} \leq 600.$$

* * * * *